United States Patent
Rice et al.

(10) Patent No.: US 9,953,640 B2
(45) Date of Patent: Apr. 24, 2018

(54) SYSTEMS AND METHODS OF INTERPRETING SPEECH DATA

(71) Applicant: Interdev Technologies Inc., Toronto (CA)

(72) Inventors: Janet M. Rice, Toronto (CA); Peng Liang, Mississauga (CA); Terence W. Kuehn, Oakville (CA)

(73) Assignee: INTERDEV TECHNOLOGIES INC., Toronto (CA)

( * ) Notice: Subject to any disclaimer, the term of this patent is extended or adjusted under 35 U.S.C. 154(b) by 0 days.

(21) Appl. No.: 14/731,819

(22) Filed: Jun. 5, 2015

(65) Prior Publication Data

US 2015/0356968 A1    Dec. 10, 2015

Related U.S. Application Data

(60) Provisional application No. 62/007,975, filed on Jun. 5, 2014.

(51) Int. Cl.

| | |
|---|---|
| *G10L 15/04* | (2013.01) |
| *G10L 15/20* | (2006.01) |
| *G10L 15/08* | (2006.01) |
| *G10L 21/02* | (2013.01) |
| *H04R 29/00* | (2006.01) |
| *G10L 15/00* | (2013.01) |
| *G06F 3/00* | (2006.01) |

(Continued)

(52) U.S. Cl.
CPC ............. *G10L 15/20* (2013.01); *G10L 15/08* (2013.01); *G10L 21/02* (2013.01); *H04R 29/006* (2013.01)

(58) Field of Classification Search
USPC ....... 704/206, 233, 236, 235, 249, 240, 251, 704/226
See application file for complete search history.

(56) References Cited

U.S. PATENT DOCUMENTS

| | | |
|---|---|---|
| 5,715,319 A | 2/1998 | Chu |
| 6,117,073 A | 9/2000 | Jones et al. |

(Continued)

OTHER PUBLICATIONS

Corresponding PCT Application No. PCT/CA2015/000360; Written Opinion dated Aug. 27, 2014.

(Continued)

*Primary Examiner* — Neeraj Sharma
(74) *Attorney, Agent, or Firm* — Bereskin & Parr LLP/S.E.N.C.R.L., s.r.l.; Stephen Beney; Joanna Ma

(57) ABSTRACT

Method and systems are provided for interpreting speech data. A method and system for recognizing speech involving a filter module to generate a set of processed audio data based on raw audio data; a translation module to provide a set of translation results for the raw audio data; and a decision module to select the text data that represents the raw audio data. A method for minimizing noise in audio signals received by a microphone array is also described. A method and system of automatic entry of data into one or more data fields involving receiving a processed audio data; and operating a processing module to: search in a trigger dictionary for a field identifier that corresponds to the trigger identifier; identify a data field associated with a data field identifier corresponding to the field identifier; and providing content data associated with the trigger identifier to the identified data field.

17 Claims, 11 Drawing Sheets

(51) Int. Cl.
*H04M 11/10* (2006.01)
*H04M 3/16* (2006.01)
*H04W 24/00* (2009.01)

(56) References Cited

U.S. PATENT DOCUMENTS

| | | | |
|---|---|---|---|
| 6,738,803 B1 | 5/2004 | Dodrill et al. | |
| 6,839,667 B2 * | 1/2005 | Reich | G10L 15/22 |
| | | | 704/239 |
| 6,859,773 B2 | 2/2005 | Breton | |
| 7,003,456 B2 * | 2/2006 | Gillick | G10L 15/32 |
| | | | 704/235 |
| 7,184,534 B2 | 2/2007 | Birch et al. | |
| 7,233,905 B1 | 6/2007 | Hutton et al. | |
| 7,260,191 B1 | 8/2007 | Laurinavichus | |
| 7,260,529 B1 | 8/2007 | Lengen | |
| 7,299,187 B2 | 11/2007 | Tahara et al. | |
| 7,421,390 B2 | 9/2008 | Simpson | |
| 7,460,999 B2 | 12/2008 | Herron et al. | |
| 7,668,736 B2 | 2/2010 | Jones et al. | |
| 7,734,481 B1 | 6/2010 | Hutton et al. | |
| 7,778,849 B1 | 8/2010 | Hutton et al. | |
| 7,908,565 B2 | 3/2011 | Katsuranis | |
| 8,050,930 B2 | 11/2011 | Jaiswal et al. | |
| 8,140,328 B2 | 3/2012 | Williams | |
| 8,204,252 B1 | 6/2012 | Avendano | |
| 8,265,932 B2 | 9/2012 | Dunsmuir | |
| 8,271,287 B1 | 9/2012 | Kermani | |
| 8,285,208 B2 | 10/2012 | Terlizzi | |
| 8,285,545 B2 | 10/2012 | Lee et al. | |
| 8,290,178 B2 | 10/2012 | Nakadai et al. | |
| 8,290,189 B2 | 10/2012 | Kellermann et al. | |
| 8,296,383 B2 | 10/2012 | Lindahl | |
| 8,321,208 B2 | 11/2012 | Tamura et al. | |
| 8,326,614 B2 | 12/2012 | Paranjpe et al. | |
| 8,326,634 B2 | 12/2012 | Di Cristo et al. | |
| 8,326,635 B2 | 12/2012 | Usher et al. | |
| 8,326,636 B2 | 12/2012 | White | |
| 8,331,966 B2 | 12/2012 | Anzures et al. | |
| 8,332,220 B2 | 12/2012 | Bodin et al. | |
| 8,332,224 B2 | 12/2012 | Di Cristo et al. | |
| 8,335,318 B2 | 12/2012 | Pan | |
| 8,335,683 B2 | 12/2012 | Acero et al. | |
| 8,335,685 B2 | 12/2012 | Hetherington | |
| 8,340,278 B2 | 12/2012 | Gowreesunker et al. | |
| 8,340,964 B2 * | 12/2012 | Konchitsky | G10L 25/78 |
| | | | 379/376.02 |
| 8,346,534 B2 | 1/2013 | Csomai et al. | |
| 8,351,618 B2 | 1/2013 | Bai et al. | |
| 8,355,908 B2 | 1/2013 | Yamabe et al. | |
| 8,401,206 B2 | 3/2013 | Seltzer et al. | |
| 8,639,508 B2 | 1/2014 | Zhao et al. | |
| 8,666,090 B1 | 3/2014 | Townsend | |
| 8,712,793 B2 | 4/2014 | Jones et al. | |
| 9,378,754 B1 | 6/2016 | Every et al. | |
| 2003/0115054 A1 * | 6/2003 | Iso-Sipila | G10L 15/02 |
| | | | 704/233 |
| 2004/0236570 A1 * | 11/2004 | Tato | G10L 15/02 |
| | | | 704/206 |
| 2006/0025897 A1 | 2/2006 | Shostak et al. | |
| 2006/0180371 A1 | 8/2006 | Breed et al. | |
| 2007/0032246 A1 * | 2/2007 | Feher | H04W 64/00 |
| | | | 455/456.1 |
| 2007/0260448 A1 * | 11/2007 | Lorenzen | G06F 17/274 |
| | | | 704/1 |
| 2008/0273714 A1 | 11/2008 | Hartung | |
| 2008/0288253 A1 * | 11/2008 | Arnone | G10L 15/02 |
| | | | 704/251 |
| 2008/0317260 A1 | 12/2008 | Short | |
| 2009/0097674 A1 | 4/2009 | Watson et al. | |
| 2010/0278352 A1 | 11/2010 | Petit et al. | |
| 2011/0058676 A1 | 3/2011 | Visser | |
| 2011/0110531 A1 | 5/2011 | Klefenz et al. | |
| 2012/0310637 A1 | 12/2012 | Vitte et al. | |
| 2013/0039505 A1 | 2/2013 | Kawano | |
| 2014/0129942 A1 * | 5/2014 | Rathod | H04N 21/44222 |
| | | | 715/720 |
| 2014/0136197 A1 | 5/2014 | Mamou et al. | |
| 2014/0162598 A1 * | 6/2014 | Villa-Real | H04M 1/66 |
| | | | 455/411 |
| 2015/0140972 A1 * | 5/2015 | Zhang | H04W 4/12 |
| | | | 455/413 |
| 2015/0255083 A1 * | 9/2015 | Krini | G10L 15/00 |
| | | | 704/226 |
| 2016/0379669 A1 * | 12/2016 | Bae | G10L 17/26 |
| | | | 704/232 |

OTHER PUBLICATIONS

Corresponding PCT Application No. PCT/CA2015/000360; International Search Report dated Aug. 27, 2014.

* cited by examiner

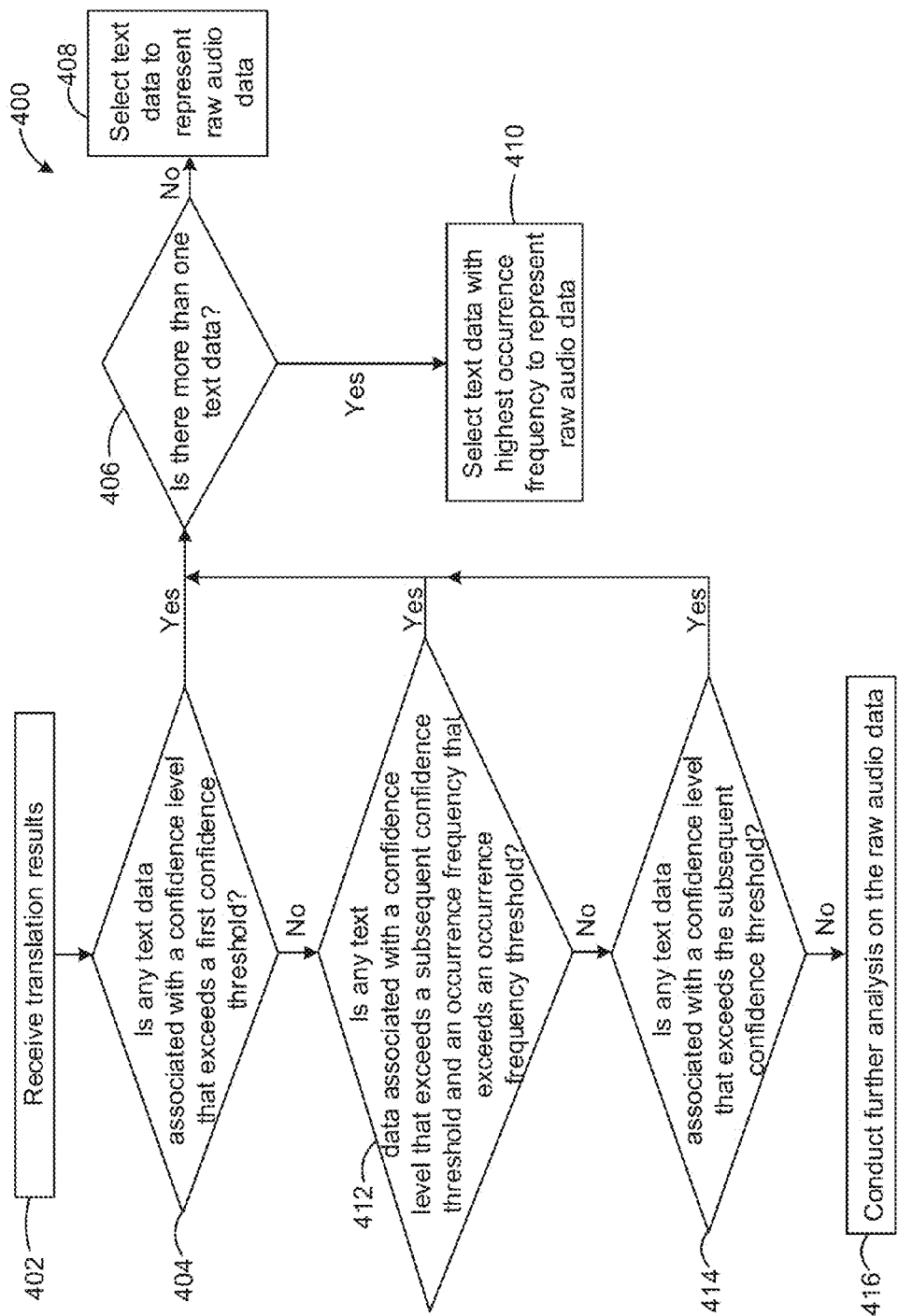

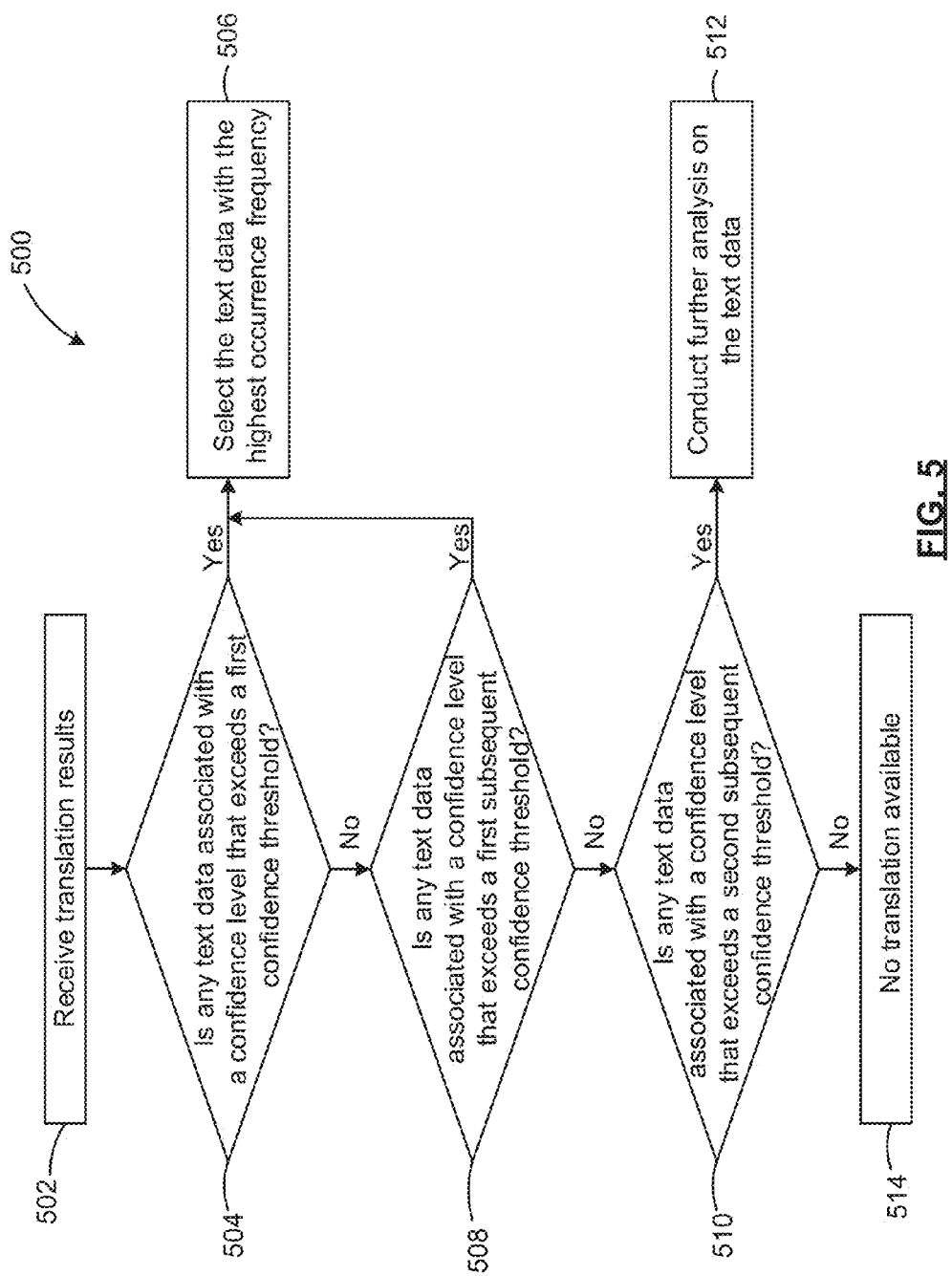

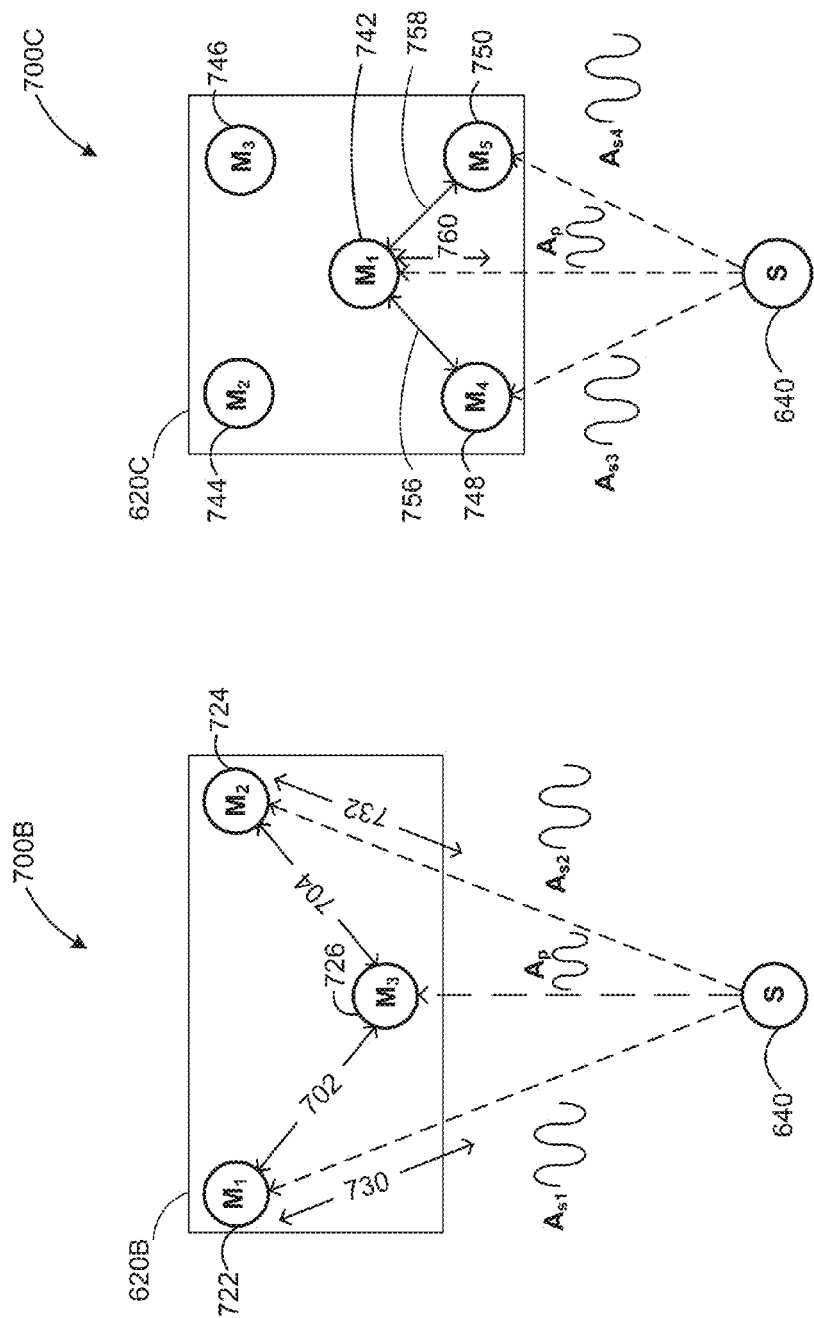

SYSTEMS AND METHODS OF INTERPRETING SPEECH DATA

CROSS-REFERENCE TO RELATED APPLICATION

This application claims the benefit of U.S. Provisional Application No. 62/007,975, entitled "Systems and Methods of Interpreting Speech Data", filed Jun. 5, 2014. The entire content of U.S. Provisional Application No. 62/007,975 is hereby incorporated by reference.

FIELD

The described embodiments relate to systems and methods of interpreting speech data and in particular, providing a speech recognition system in uncontrolled environments.

BACKGROUND

In certain environments, speech data may be the only source of information that is immediately available. The individuals involved in an event may be preoccupied by other urgent tasks and thus, unable to record, by hand, the relevant details until after the event ended. At that time, the individuals may not be able to fully and accurately recall the details, and there would be a delay before that information would be available to others who may require that information.

Emergency medicine, for example, tends to operate in a fast-paced and rugged environment. When attending to an individual in an emergency situation, emergency response personnel needs to act quickly, and typically with limited resources, to stabilize that individual as much as possible and transport that individual to a medical center for further treatment by other medical professionals. Emergency response personnel, therefore, have limited opportunity to record their interaction with the individual until after their arrival at the medical center and other medical professionals assume the treatment of that individual. The medical professionals at the medical center, therefore, would have limited information on the condition and treatment of that individual.

It is, therefore, important for there to be systems and methods for accurately capturing information based on speech data and sharing that information with other relevant individuals.

SUMMARY

The various embodiments described herein generally relate to methods (and associated systems configured to implement the methods) for interpreting speech data.

In accordance with an embodiment, there is provided a speech recognition system comprising: a filter module to generate a set of processed audio data based on raw audio data, the filter module applying filter processes to the raw audio data to generate the set of processed audio data; a translation module to provide a set of translation results for the raw audio data based on the set of processed audio data, each translation result being associated with at least one processed audio data and each translation result including a text data and a confidence level associated with that text data; and a decision module to select the text data that represents the raw audio data.

In some embodiments, the filter processes comprise at least two different filter processes.

In some embodiments, the filter module comprises at least one of a blind source filter, a phase shift filter, a subtract spectrum filter, a comb filter, a low pass filter, a high pass filter, and a band pass filter.

In some embodiments, the filter processes are provided by two or more filters.

In some embodiments, the two or more filters comprises a composite filter, the composite filter including two or more of a blind source filter, a phase shift filter, a subtract spectrum filter, a comb filter, a low pass filter, a high pass filter, and a band pass filter.

In some embodiments, each translation result comprises a sub-set of translation results for at least one of the processed audio data, the sub-set of translation results including two or more text data and each text data is associated with a respective confidence level.

In some embodiments, the two or more text data correspond to alternative representations of the raw audio data.

In some embodiments, the decision module selects the text data based on a respective confidence level.

In some embodiments, the decision module determines whether any text data is associated with the respective confidence level that exceeds a confidence threshold.

In some embodiments, the decision module: determines multiple text data are associated with respective confidence levels that exceed the confidence threshold; and selects the text data that corresponds to the raw audio data based on at least an occurrence frequency of each text data in the multiple translation results, the occurrence frequency being a number of times that the text data appears in the multiple translation results.

In some embodiments, the decision module selects the text data associated with a highest occurrence frequency as the text data that corresponds to the raw audio data.

In some embodiments, the confidence threshold comprises a set of confidence thresholds, the set of confidence thresholds including a first confidence threshold and at least one subsequent confidence threshold that is lower than the first confidence threshold; and the decision module: determines that none of the text data is associated with the respective confidence level that exceeds the first confidence threshold; and determines whether any text data is associated with the respective confidence level that exceeds the at least one subsequent confidence threshold.

In some embodiments, the decision module: determines that multiple text data are associated with respective confidence levels that exceed the at least one subsequent confidence threshold; and selects the text data that corresponds to the raw audio data based on an occurrence frequency of each text data, the occurrence frequency being a number of times that the text data appears in the multiple translation results.

In some embodiments, the decision module selects the text data associated with a highest occurrence frequency as the text data that corresponds to the raw audio data.

In some embodiments, the decision module selects the text data associated with the occurrence frequency that exceeds an occurrence threshold as the text data that corresponds to the raw audio data.

In some embodiments, the occurrence threshold is at least three.

In some embodiments, the decision module: determines that none of the text data is associated with the respective confidence level that exceeds the at least one subsequent confidence threshold; and indicates additional processing is required to translate the raw audio data.

In some embodiments, the at least one subsequent confidence threshold comprises a first subsequent confidence threshold and a second subsequent confidence threshold that is lower than the first subsequent confidence threshold; and the decision module: determines that none of the text data is associated with a confidence level that exceeds the first subsequent confidence threshold; determines that at least one text data is associated with a confidence level that exceeds the second subsequent confidence threshold; and indicates additional processing on the at least one text data is required to translate the raw audio data.

In some embodiments, the at least one subsequent confidence threshold is within a range of approximately 40% to 75%.

In some embodiments, the first subsequent confidence threshold is 75% and the second subsequent confidence threshold is 40%.

In some embodiments, the first confidence threshold is within a range of approximately 80% to 95%.

In accordance with an embodiment, there is provided a method of recognizing speech. The method comprising: generating a set of processed audio data based on raw audio data by applying filter processes to the raw audio data to generate the set of processed audio data; providing a set of translation results for the raw audio data based on the set of processed audio data, each translation result being associated with at least one processed audio data and each translation result including a text data and a confidence level associated with that text data; and selecting the text data that corresponds to the raw audio data.

In some embodiments, the filter processes comprise at least two different filter processes.

In some embodiments, each translation result comprises a sub-set of translation results for at least one of the processed audio data, the sub-set of translation results including two or more text data and each text data is associated with a respective confidence level.

In some embodiments, the two or more text data correspond to alternative representations of the raw audio data.

Some of the described methods further comprise selecting the text data based on the respective confidence level.

Some of the described methods further comprise determining whether any text data is associated with the respective confidence level that exceeds a confidence threshold.

Some of the described methods further comprise: determining multiple text data are associated with confidence levels that exceed the confidence threshold; and selecting the text data that corresponds to the raw audio data based on at least an occurrence frequency of each text data in the multiple translation results, the occurrence frequency being a number of times that the text data appears in the multiple translation results.

Some of the described methods further comprise selecting the text data associated with a highest occurrence frequency as the text data that corresponds to the raw audio data.

In some embodiments, the confidence threshold comprises a set of confidence thresholds, the set of confidence thresholds including a first confidence threshold and at least one subsequent confidence threshold that is lower than the first confidence threshold; and some of the described methods further comprise: determining that none of the text data is associated with the respective confidence level that exceeds the first confidence threshold; and determining whether any text data is associated with the respective confidence level that exceeds the at least one subsequent confidence threshold.

Some of the described methods further comprise: determining that multiple text data are associated with confidence levels that exceed the at least one subsequent confidence threshold; and selecting the text data that corresponds to the raw audio data based on an occurrence frequency of each text data, the occurrence frequency being a number of times that the text data appears in the multiple translation results.

Some of the described methods further comprise: selecting the text data associated with a highest occurrence frequency as the text data that corresponds to the raw audio data.

Some of the described methods further comprise: selecting the text data associated with the occurrence frequency that exceeds an occurrence threshold as the text data that corresponds to the raw audio data.

In some embodiments, the occurrence threshold is at least three.

Some of the described methods further comprise: determining that none of the text data is associated with the respective confidence level that exceeds the at least one subsequent confidence threshold; and indicating additional processing is required to translate the raw audio data.

In some embodiments, the at least one subsequent confidence threshold comprises a first subsequent confidence threshold and a second subsequent confidence threshold that is lower than the first subsequent confidence threshold; and the method further comprises: determining that none of the text data is associated with a confidence level that exceeds the first subsequent confidence threshold; determining that at least one text data is associated with a confidence level that exceeds the second subsequent confidence threshold; and indicating additional processing on the at least one text data is required to translate the raw audio data.

In some embodiments, the at least one subsequent confidence threshold is within a range of approximately 40% to 75%.

In some embodiments, the first subsequent confidence threshold is 75% and the second subsequent confidence threshold is 40%.

In some embodiments, the first confidence threshold is within a range of approximately 80% to 95%.

In accordance with another embodiment, there is provided a method for minimizing noise in audio signals received by a microphone array. The method comprising: providing a principal microphone and one or more supplemental microphones in a microphone array for receiving a principal audio signal and one or more supplemental audio signals respectively, the principal microphone and each supplemental microphone being spaced from one another; for each supplemental microphone: determining an array phase difference based on a spacing between the principal microphone and that supplemental microphone, the array phase difference being relative to the principal audio signal; determining a phase shift associated with a supplemental audio signal received by that supplemental microphone; determining whether any portion of the supplemental audio signal is associated with a respective phase shift that is different from the array phase difference; in response to determining that a portion of the supplemental audio signal is associated with a different phase shift from the array phase difference, identifying frequencies associated with that portion of the supplemental audio signal; and removing that portion of the supplemental audio signal and a portion of the principal audio signal associated with the identified frequencies.

Some of the described methods further comprise: calibrating at least the principal microphone and each supplemental microphone prior to receiving the principal audio signal and each supplemental audio signal.

In some embodiments, each supplemental microphone comprises a first supplemental microphone and a second supplemental microphone for receiving a first supplemental audio signal and a second supplemental audio signal respectively, each of the first supplemental microphone and the second supplemental microphone being spaced apart from each other and from the principal microphone.

In some embodiments, the spacing between the principal microphone and each of the first supplemental microphone and the second supplemental microphone is the same.

In some embodiments, the spacing between the principal microphone and each of the first supplemental microphone and the second supplemental microphone is different.

In some embodiments, two or more supplemental microphones and the principal microphone are provided in a triangular configuration.

In some embodiments, that supplemental microphone further comprises a third supplemental microphone and a fourth supplemental microphone for receiving a third supplemental audio signal and a fourth supplemental audio signal respectively, each of the third supplemental microphone and the fourth supplemental microphone being spaced apart from each other and from the principal microphone.

In some embodiments, the supplemental microphones surround the principal microphone.

In some embodiments, the supplemental microphones are provided in a quadrilateral configuration and the principal microphone is provided at a substantially central location of the quadrilateral configuration.

In some embodiments, each microphone in the microphone array is unidirectional.

In accordance with another embodiment, there is provided a method of automatic entry of data into one or more data fields. The method comprising: receiving a processed audio data, the processed audio data including a trigger identifier; operating a processing module to: search in a trigger dictionary for a field identifier that corresponds to the trigger identifier, the trigger dictionary including a plurality of trigger identifiers and each trigger identifier is associated with one or more field identifiers; identify, from the one or more data fields, a data field that is associated with a data field identifier corresponding to the field identifier, the identified data field is provided for receiving data associated with the trigger identifier; and providing content data associated with the trigger identifier to the identified data field.

In some embodiments, providing content data associated with the trigger identifier comprises: determining a content source for the identified data field based on the trigger identifier, the content source indicating an origin of the content data to be provided to the identified data field; and receiving the content data associated with the trigger identifier from the determined content source.

In some embodiments, the content source is the processed audio data, the processed audio data including the content data associated with the trigger identifier.

In some embodiments, providing the content data further comprises: providing a user control for receiving an input to access a portion of the processed audio data corresponding to the content data.

In some embodiments, the user control is displayed in proximity to the data field.

In some embodiments, the user control is an audio icon.

In some embodiments, identifying the data field comprises: in response to failing to identify a data field that is associated with the data field identifier corresponding to the field identifier, indicating the content data associated with the trigger identifier requires additional analysis in order to be inputted into the respective data field.

Some of the described methods further comprise: storing, in a storage module, the content data associated with that trigger identifier; and associating that content data with a manual analysis identifier for indicating that content data requires additional analysis.

In some embodiments, each trigger identifier in the trigger dictionary is associated with one or more expected contents, each expected content indicating data that is acceptable by the corresponding data field; and providing the content data further comprises determining whether the content data corresponds with any expected content associated with that trigger identifier.

Some of the described methods further comprise: in response to determining the content data fails to correspond to any expected content, indicating the content data associated with that trigger identifier requires additional analysis in order to be inputted into the respective data field.

Some of the described methods further comprise: storing, in a storage module, the content data associated with that trigger identifier; and associating that content data with a manual analysis identifier for indicating that content data requires additional analysis.

In some embodiments, the one or more expected contents comprises at least one of a word, a phrase, a list of words, a list of phrases and any text data.

In some embodiments, the content source is an external device; and receiving the content data associated with that trigger identifier comprises initiating communication with the external device.

In some embodiments, the external device is any one of a bar code scanner, a defibrillator and a magnetic card reader.

In some embodiments, the one or more data fields are provided on a data form.

In accordance with another embodiment, there is provided a system for automatic entry of data into one or more data fields. The system comprising: a processing module configured to: receive a processed audio data, the processed audio data including a trigger identifier; search in a trigger dictionary for a field identifier that corresponds to the trigger identifier, the trigger dictionary including a plurality of trigger identifiers and each trigger identifier is associated with one or more field identifiers; identify, from the one or more data fields, a data field that is associated with a data field identifier corresponding to the field identifier, the identified data field is provided for receiving data associated with the trigger identifier; and provide content data associated with the trigger identifier to the identified data field.

In some embodiments, the processing module is further configured to: determine a content source for the identified data field based on the trigger identifier, the content source indicating an origin of the content data to be provided to the identified data field; and receive the content data associated with the trigger identifier from the determined content source.

In some embodiments, the content source is the processed audio data, the processed audio data including the content data associated with the trigger identifier.

In some embodiments, the processing module is further configured to: provide a user control for receiving an input to access a portion of the processed audio data corresponding to the content data.

In some embodiments, the user control is displayed in proximity to the data field.

In some embodiments, the user control is an audio icon.

In some embodiments, the processing module is further configured, in response to failing to identify a data field, to indicate the content data associated with the trigger identifier requires additional analysis in order to be inputted into the respective data field.

In some embodiments, the processing module is further configured to: store, in a storage module, the content data associated with that trigger identifier; and associate that content data with a manual analysis identifier for indicating that content data requires additional analysis.

In some embodiments, each trigger identifier in the trigger dictionary is associated with one or more expected contents, each expected content indicating data that is acceptable by the corresponding data field; and the processing module is further configured to determine whether the content data corresponds with any expected content associated with that trigger identifier.

In some embodiments, the processing module is further configured, in response to determining the content data fails to correspond to any expected content, indicate the content data associated with that trigger identifier requires additional analysis in order to be inputted into the respective data field.

In some embodiments, the processing module is further configured to: store, in a storage module, the content data associated with that trigger identifier; and associate that content data with a manual analysis identifier for indicating that content data requires additional analysis.

In some embodiments, the one or more expected contents comprises at least one of a word, a phrase, a list of words, a list of phrases and any text data.

In some embodiments, the content source is an external device; and the processing module is configured to initiate communication with the external device.

In some embodiments, the external device is any one of a bar code scanner, a defibrillator and a magnetic card reader.

In some embodiments, the one or more data fields are provided on a data form.

BRIEF DESCRIPTION OF THE DRAWINGS

Several embodiments of the present invention will now be described in detail with reference to the drawings, in which:

FIG. 4 is a flowchart of a method of selecting text data to represent the raw audio data in accordance with an example embodiment;

FIG. 5 is a flowchart of a method of selecting text data to represent the raw audio data in accordance with another example embodiment;

FIGS. 7A to 7C are schematics of different configurations of a microphone array in accordance with various example embodiments;

Figure 1:
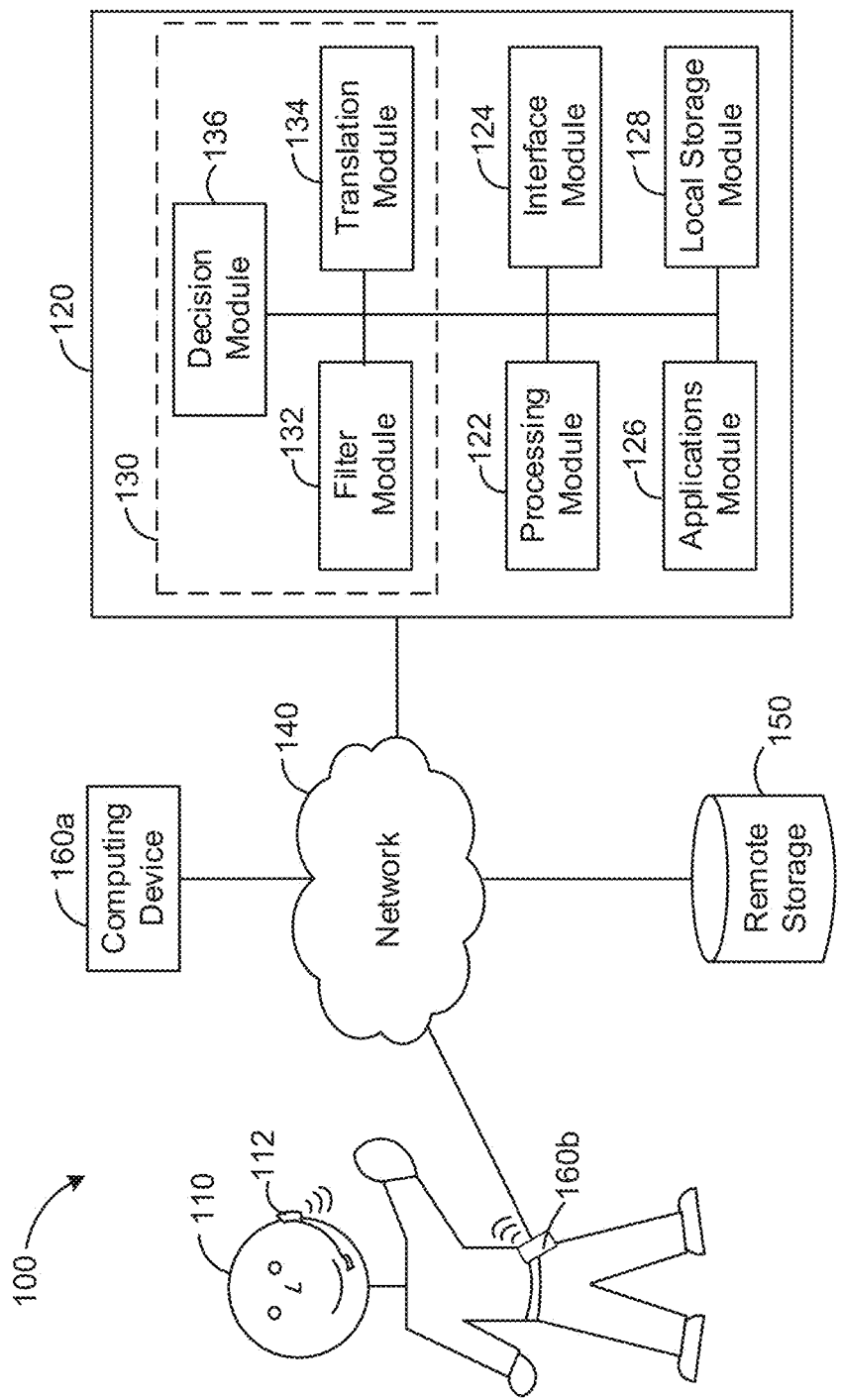
FIG. 1 is a block diagram of components interacting with a record system in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

In certain uncontrolled environments, such as rescue situations, emergency response situations (e.g., by the police department, fire department or medical professionals), and large events (e.g., concerts, sports events, etc.), the collection of data, especially by hand, can be difficult. For example, the number of individuals in those uncontrolled environments can vary substantially and the surrounding noise can be difficult to manage or navigate. The information, however, may be required to be shared with others as soon as possible so that all relevant personnel have access to the most up-to-date information.

In many of these situations, the information can be provided by those individuals as speech data. The interpretation and processing of the speech data are described herein.

For example, in rescue situations, information regarding a medical condition of an individual, and past and current treatment provided to the individual can be critical to ensuring a suitable and consistent medical treatment. In the case of emergency medical services, however, medical information regarding that individual can be difficult to be immediately captured and shared with other necessary medical professionals. Accordingly, systems and methods for accurately capturing and sharing that information as soon as possible are needed.

Some example embodiments described herein include providing a speech recognition system. The speech recognition system can receive raw audio data as an individual conducts other urgent tasks, such as a medical professional attending to an injured individual. To enhance the quality of the audio data, the speech recognition system involves applying various filter processes to the raw audio data to generate a set of processed audio data. The filter processes may include various different processes. Each filter process can generate a similar or different processed audio data based on the raw audio data. The speech recognition system can then generate a set of translation results for each processed audio data. Each translation result can include, at least, a text data representing the raw audio data and a confidence level for that text data. From the set of translation results, the translation result is selected to represent the raw audio data.

In some other embodiments, the described methods involve minimizing noise in the audio signals. The audio signals may be received by a microphone array, for example. The microphone array can include a principal microphone and one or more supplemental microphones. By determining an array phase difference based on a spacing between the principal microphone and each of the supplemental microphones, any audio signal received at the supplemental microphone that includes a phase shift that is different from the array phase difference can be considered a noise signal.

Once the raw audio data is captured by the described systems and methods, some embodiments involve automatically entering corresponding processed audio data into related data fields. The processed audio data can include a trigger identifier, for example. The trigger identifier can be associated with at least one field identifier and that field identifier can indicate which data field should receive that processed audio data. When the processed audio data is received, a trigger dictionary can be searched to locate a field identifier that corresponds to the trigger identifier. The data field that corresponds to the field identifier can then be used to receive that processed audio data.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smartphone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Reference is first made to FIG. 1, which illustrates a block diagram 100 of components interacting with an example embodiment of a record system 120. As shown in FIG. 1, the record system 120 is in communication, via a network 140, with one or more computing devices 160, such as computing device 160*a* and computing device 160*b*, and a remote storage 150.

The network 140 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX, SS7 signaling network, fixed line, local area network, wide area network, and others, including any combination of these, capable of interfacing with, and enabling communication between the computing devices 160, the record system 120 and/or the remote storage 150.

The record system 120 can include various modules, such as a processing module 122, an interface module 124, an applications module 126, a local storage module 128, and a speech recognition module 130. As will be described, the speech recognition module 130 can include a filter module 132, a translation module 134 and a decision module 136. As shown in FIG. 1, the various modules in the record system 120 can be in electrical communication with each other.

It will be understood that in some embodiments, each of the processing module 122, the interface module 124, the applications module 126, the local storage module 128, the filter module 132, the translation module 134 and the decision module 136 may be combined into fewer number of modules or may be separated into further modules. Furthermore, the processing module 122, the interface module 124, the applications module 126, the local storage module 128, the filter module 132, the translation module 134 and the decision module 136 may be implemented in software or hardware, or a combination of software and hardware. Furthermore, the modules 132, 134 and 136 are typically implemented using software, but there may be embodiments in which they may be implemented with some hardware, such as application specific circuitry or some other suitable technique.

The processing module 122 may be configured to control the operation of the record system 120. The processing module 122 may be any suitable processors, controllers or digital signal processors that can provide sufficient processing power depending on the configuration, purposes and requirements of the record system 120. In some embodiments, the processing module 122 can include more than one processor, with each processor being configured to perform different dedicated tasks.

The processing module 122 can initiate and manage the operations of each of the other modules in the record system 120. The processing module 122 may also determine, based on received data, stored data and/or user preferences, how the processing module 122 may generally operate.

The interface module 124 may be any interface that enables the record system 120 to communicate with other devices and systems. In some embodiments, the interface module 124 can include at least one of a serial port, a parallel port or a USB port. The interface module 124 may also include at least one of an Internet, Local Area Network (LAN), Ethernet, Firewire, modem or digital subscriber line connection. Various combinations of these elements may be incorporated within the interface module 124.

For example, the interface module 124 may receive input from various input devices, such as a mouse, a keyboard, a touch screen, a thumbwheel, a track-pad, a track-ball, a card-reader, voice recognition software and the like depending on the requirements and implementation of the record system 120.

The applications module 126 can include one or more different programs that can be initiated for facilitating the capture and sharing of the audio data. The speech recognition module 130 may be provided as part of the applications module 126, for example. Other example programs can include a noise minimization program for reducing noise data in the audio data and an automatic data entry program for automatically entering processed audio data into one or more fields on a form. Each of these example programs will be further described.

The local storage module 128 can include RAM, ROM, one or more hard drives, one or more flash drives or some other suitable data storage elements such as disk drives, etc. The local storage module 128 may further include one or more databases (not shown) for storing information relating to, for example, the user 110 providing the speech data (e.g., a medical personnel) and the computing devices 160, and a trigger word dictionary. For emergency response applications, the local storage module 128 may further include records associated with the relevant individuals (e.g., individuals receiving treatment, etc.) and emergency response forms. In some embodiments, one database may be used to store this information. In some other embodiments, one database may be used to store, for example, information related to the computing devices 160 (e.g., operational capabilities of the computing devices 160) and another database may be used to store, for example, information related to the user 110 (e.g., an access level of the medical professional or police officer).

Similar to the local storage module 128, the remote storage 150 can include one or more databases for storing information relating to, for example, the user 110 and the computing devices 160, and a trigger word dictionary. For emergency response applications, the remote storage 150 may include records associated with the relevant individuals (e.g., an individual receiving treatment or being arrested) and relevant forms (e.g., medical forms, event organization checklists, etc.). The databases may be provided on one or more computer servers, for example. The computer may be distributed over a wide geographic area and connected via the network 140.

The speech recognition module 130 can receive raw audio data via the network 140 from one or more of the computing devices 160 and provide a text data corresponding to a translation of that raw audio data. In the example shown in FIG. 1, raw audio data may be received via the interface module 124 from the computing device 160*b* worn by a user 110 and/or from the computing device 160*a*. It will be understood that a fewer or a greater number of computing devices 160 may communicate with the record system 120 via the network 140.

Each of the computing devices 160 may be any networked device operable to connect to the network 140. A networked device is a device capable of communicating with other devices through a network such as the network 140. A network device may couple to the network 140 through a wired or wireless connection.

These computing devices 160 may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

In some embodiments, these computing devices 160 may be a laptop or a smartphone equipped with a network adapter for connecting to the Internet. In some embodiments, the connection request initiated from the computing devices 160*a* and 160*b* may be initiated from a web browser and directed at a web interface provided by the interface module 124.

In some embodiments, the computing devices 160 may be in electrical communication with another electronic device for capturing the audio data. For example, in FIG. 1, the computing device 160*b* receives raw audio data captured by a microphone of a headset 112 worn by that user 110. The user 110 may be an emergency response personnel, such as an emergency medical technician (EMT), an event organizer, or other users providing the speech data.

In the example of an emergency response situation, as the medical professional 110 provides treatment to an individual, the medical professional 110 can audibly describe the interaction and the treatment being provided to that individual so that the information is captured by the microphone. The headset 112 can then provide the received audio data to the computing device 160*b* via a wired or wireless connection.

Raw audio data may similarly be provided by the computing device 160*a*, which can receive and store relevant information for the record system 120.

The raw audio data received by the speech recognition module 130 is typically embedded with noise artifacts from the environment. For example, when the raw audio data is provided from the computing device 160*b* during an emergency response, the resulting raw audio data may include a substantial amount of noise generated from the road (e.g., construction, traffic, etc.), weather conditions (e.g., rain, thunder, etc.), the ambulance or police vehicle or fire truck (e.g., siren sound, medical machinery, etc.), conversations between the relevant individuals (e.g., medical professionals providing treatment to the individual), sounds from the individual being treated and other factors.

To enhance the quality of the audio data, the filter module 132 can receive and process the raw audio data to remove as much of the noise artifacts as possible. For example, the filter module 132 can generate a set of processed audio data based on the raw audio data by applying filter processes to the raw audio data. The filter processes may include two or more different filter processes and so, different processed audio data may be generated from those filter processes. Each of the filter process may be provided by a different filter. For example, the filter module may include one or more of a source filter, a phase shift filter, a subtract spectrum filter, a comb filter, a low pass filter, a high pass filter, and/or a band pass filter. In some embodiments, the filter module can include a composite filter which is a combination of two or more different filters. It will be understood that other similar filters may be used.

By providing multiple different processed audio data with the different filters, the filter module 132 can enhance the quality of the processed audio data since different filters are more suited for certain situations. For example, the blind source filter is generally more appropriate for environments with a large amount of noise, such as in environments where a large number of conversations are taking place. The phase shift filter is more appropriate for environments with fewer noise sources and noise sources that are not generating signals from the same direction as an audio source. Certain other filters, such as the low pass filter, the high pass filter and the band pass filter, are appropriate for eliminating discrete and more easily distinguishable noise sources, such as tire and engine noise of the ambulance.

After the filter module 132 generates the set of processed audio data, the translation module 134 can provide a set of translation results for the raw audio data based on the processed audio data. Each translation result can include a text data corresponding to the processed audio data and a confidence level associated with that text data. In some embodiments, each translation result can include two or more different text data and each text data is associated with a different confidence level. The different text data corresponds to alternative representations of the raw audio data based on that processed audio data.

In some embodiments, the translation module 134 may separate the set of processed audio data into one or more portions based on various grammatical or audio indicators. For example, the translation module 134 may identify the occurrence of each pause in the processed audio data and separate the processed audio data into portions that correspond to individual words. The translation module 134 may also separate the processed audio data into phrases based on one or more trigger words in the audio data.

Based on the set of translation results generated by the translation module 134, the decision module 136 can determine and select one of the translation results to represent the raw audio data. As will be described, the decision module 136 may select the translation result for the raw audio data based on various different algorithms.

Example embodiments of the operation of the speech recognition module 130 will now be described with reference to FIGS. 2 to 5.

Figure 2:
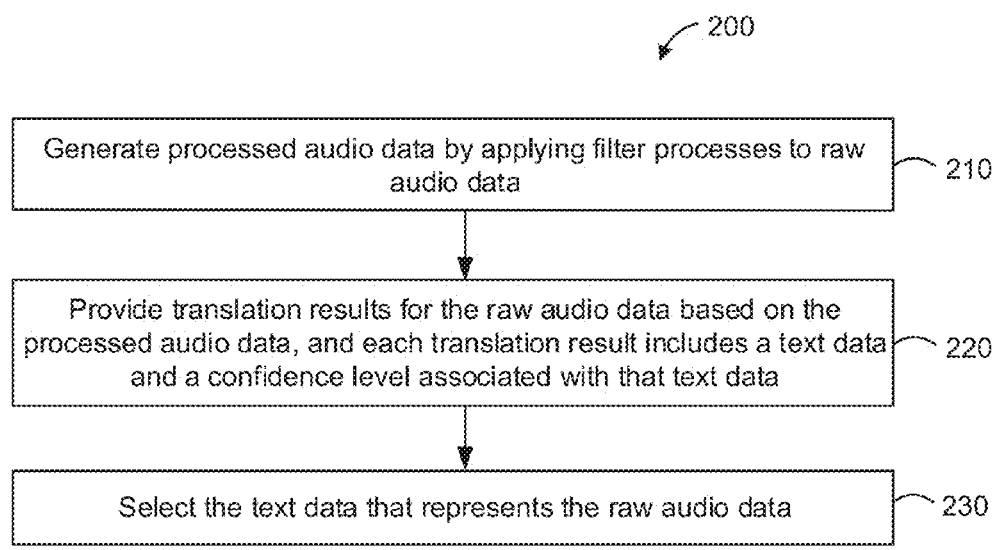
FIG. 2 is a flowchart of a method for speech recognition in accordance with an example embodiment.

Referring now to FIG. 2, an example method 200 for speech recognition is shown in a flowchart. To illustrate the example method, reference will be made simultaneously to FIG. 3, which is a screenshot of a user interface 300 for the record system 120.

At 210, the filter module 132 generates processed audio data by applying filter processes to raw audio data.

Figure 3:
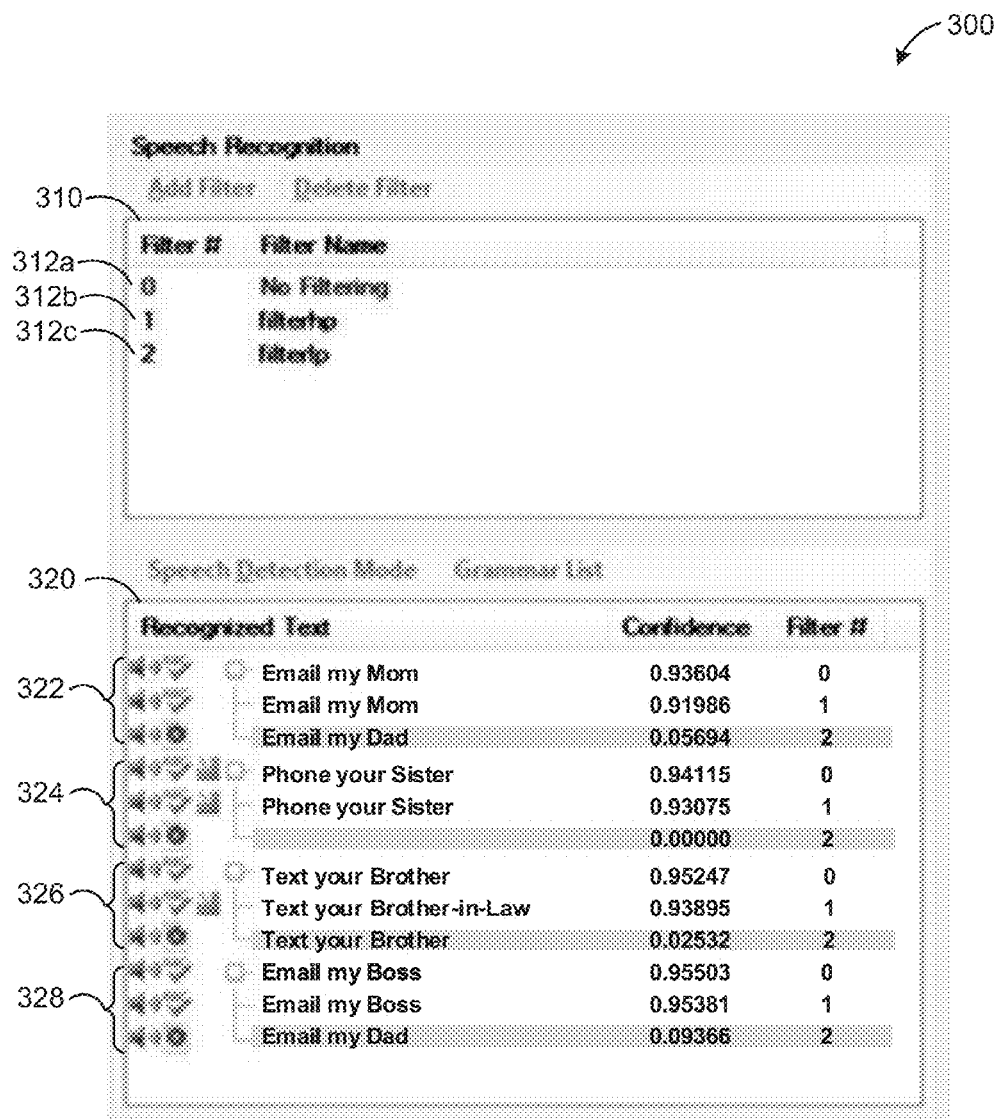
FIG. 3 is a screenshot of a user interface for a record system in accordance with an example embodiment.

As shown in the filter list 310 of FIG. 3, in this example, the filter module 132 can apply three different filter processes with different filters 312 to the raw audio data. The different filters 312 include no filter 312a, a high pass filter 312b and a low pass filter 312c. Each filter 312 can generate a processed audio data corresponding to the raw audio data.

Different filters are suited for different environments. The use of different filter processes at the filter module 132 can be crucial for removing as much noise signals as possible from the audio signal. For example, the high pass filter 312b and the low pass filter 312c can be more appropriate for eliminating discrete noise sources, which may be more appropriate in the example of FIG. 3.

At 220, the translation module 134 provides a set of translation results for the raw audio data based on the processed audio data.

The translation module 134 provides at least one translation result for each processed audio data. An example set of translation results is generally shown at 320 in FIG. 3. The set of translation results 320 includes multiple translation results, such as 322, 324, 326 and 328, for each processed audio data. In the example of FIG. 3, the processed audio data are phrases.

Each translation result includes a text data and a confidence level associated with that text data. The confidence level may correspond to statistical values generated by known speech recognition engines. The speech recognition module 130 may alternatively generate confidence levels based on factors corresponding to the user preferences and the environment.

For the translation results 322, the translation module 134 determined that the processed audio data generated by filters 312a and 312b correspond to the text "Email my Mom". Each of the text data is associated with a different confidence level, namely 93.604% for the processed audio data generated by filter 312a and 91.986% for the processed audio data generated by filter 312b. For the processed audio data generated by the filter 312c, the translation module 134 determines that the corresponding text data is "Email my Dad" with a confidence level of 5.694%.

For the translation results 324, the translation module 134 determined that the processed audio data generated by filters 312a and 312b correspond to the text "Phone your Sister". Each of the text data is associated with a different confidence level, namely 94.115% for the processed audio data generated by filter 312a and 93.075% for the processed audio data generated by filter 312b. For the processed audio data generated by the filter 312c, the translation module 134 was unable to determine a corresponding text data. The audio signal in the raw audio data may be associated with a high range of frequency that was removed by the low pass filter 312c and therefore, the filter 312c may not be appropriate for the raw audio data in the example shown in FIG. 3.

For the translation results 326, the translation module 134 determined that the processed audio data generated by filters 312a and 312c correspond to the text "Text your Brother" and the processed audio data generated by the filter 312b correspond to the text "Text your Brother-in-Law". Each of the text data, however, is associated with a different confidence level, namely 95.247% for the processed audio data generated by filter 312a, 93.895% for the processed audio data generated by filter 312b and 2.532% for the processed audio data generated by filter 312c. Although the translation module 134 determined the same text data based on the processed audio data provided by the filters 312a and 312c, the corresponding confidence levels are very different between the data provided by filter 312a and filter 312c.

Similar to the translation results 322, the translation results 328 include text data corresponding to processed audio data generated by the filters 312a and 312b that are associated with a higher confidence level, namely 95.503% and 95.381% respectively, than the text data corresponding to processed audio data generated by the filter 312c (confidence level of 9.3665%).

At 230, the decision module 136 selects the text data that represents the raw audio data.

The decision module 136 determines which text data represents the raw audio data based on the confidence level associated with each of the text data. In some embodiments, the decision module 136 may select the text data associated with the highest confidence level. In some embodiments, the decision module 136 may select the text data that exceeds a confidence threshold. Example embodiments for selecting the text data will be described with reference to FIGS. 4 and 5.

FIG. 4 is a flowchart of an example method 400 of selecting text data for the raw audio data.

At 402, the decision module 136 receives translation results from the translation module 134.

The set of translation results 320 can be provided to the translation module 134 for processing. In some embodiments, the decision module 136 may receive the set of translation results 320 in segments. That is, the decision module 136 can receive and process the translation results 322 separately from the translation results 324.

At 404, the decision module 136 determines if any text data is associated with a confidence level that exceeds a first confidence threshold.

The first confidence threshold is a confidence level that generally indicates the corresponding text data is an acceptable, and likely accurate, representation of the raw audio data. Therefore, when a text data is associated with the confidence level that exceeds the first confidence threshold, the decision module 136 can determine that text data represents the raw audio data and can proceed to 406. For example, referring again to FIG. 3, if the first confidence threshold is 90%, the text data associated with filters 312a and 312b are associated with a confidence level that exceeds the first confidence threshold.

Alternatively, if the first confidence threshold is 95%, none of the translation results 322 are associated with the confidence level that exceeds the first confidence threshold. In this case, the decision module 136 can proceed to 412.

In some embodiments, the first confidence threshold may be within a range of approximately 80% to 95%. In some embodiments, the first confidence threshold may vary for different users and therefore, may depend on the user preference settings associated with the user.

At 406, the decision module 136 determines whether there are more than one text data that exceeds the first confidence threshold.

Continuing with the example of the first confidence threshold being 90% for the translation results 322, since both the text data corresponding to filters 312a and 312b are associated with a confidence level that exceeds the first confidence threshold, the decision module 136 proceeds to 410 to determine which of the text data represents the raw audio data.

If the decision module 136 determines that only one text data is associated with a confidence level that exceeds the first confidence threshold, the decision module 136 selects that text data as the text data to represent the raw audio data (at 408).

At 410, the decision module 136 selects text data with the highest occurrence frequency to represent the raw audio data.

The decision module 136 can select one of the text data based on the occurrence frequency of that text data. The occurrence frequency is a number of times that the text data appears in the translation results. The decision module may select the text data associated with a highest occurrence frequency as the text data that represents the raw audio data. In some embodiments, the decision module 136 can select the text data based on whether the associated occurrence frequency exceeds an occurrence threshold. The occurrence threshold may be at least three.

Still continuing with the example of the first confidence threshold being 90% for the translation results 322, the decision module 136 determines that the text data corresponding to filters 312a and 312b are the same and therefore, the occurrence frequency for the text data, "Email my Mom", is two. The text data associated with either filters 312a and 312b can be used.

In another example in which the first confidence threshold is again 90%, the translation results 326 includes text data corresponding to filters 312a and 312b that are associated with a confidence level that exceeds the first confidence threshold. In order to select the text data between the filters 312a and 312b, the decision module 136 determines that the occurrence frequency for the text data "Text your Brother" is two since the text data corresponding to the filter 312c is also "Text your Brother", whereas the occurrence frequency for the text data "Text your Brother-in-law" corresponding to the filter 312b is one. Accordingly, the decision module 136 can select the text data corresponding to the filter 312a to represent the raw audio data.

At 412, after determining that none of the text data is associated with a confidence level that exceeds the first confidence threshold, the decision module 136 determines whether any text data is associated with a confidence level that exceeds a subsequent confidence threshold and also exceeds the occurrence frequency threshold.

Generally, the decision module 136 may operate using a set of different confidence thresholds, such as the first confidence threshold and at least one subsequent confidence threshold that is lower than the first confidence threshold. For example, the subsequent confidence threshold may be within a range of approximately 40% to 75%.

Although the text data associated with a confidence threshold that exceeds the first confidence threshold is preferred, text data that is associated with a lower confidence threshold may still be an acceptable representation of the raw audio data. Continuing now with the above example for the translation results 322 in which the first confidence threshold is 95%. Although none of the translation results 322 are associated with the confidence level that exceeds the first confidence threshold, if the subsequent confidence threshold is 70%, the text data corresponding to both filters 312a and 312b are associated with a confidence level that exceeds the subsequent confidence threshold.

Since none of the text data in the translation results 322 is associated with a confidence level that exceeds the first confidence threshold, the decision module 136 further verifies that the text data represents the raw audio data by determining whether the text data is associated with the occurrence frequency that exceeds the occurrence frequency threshold. Similar to the confidence threshold, the occurrence frequency threshold is a minimum number of times for a text data to appear in the translation results in order to justify that text data to be an acceptable representation of the raw audio data.

Continuing with the example for the translation results 322 with the subsequent confidence threshold as 70%, in the case that the occurrence frequency threshold is three, neither text data corresponding to filters 312a and 312b would be sufficient since, as noted above, the occurrence frequency for the text data, "Email my Mom", is two. The decision module 136, therefore, proceeds to 414.

In the case that the decision module 136 determines that multiple text data is associated with a confidence level that exceeds the subsequent confidence threshold and is also associated with an occurrence frequency that exceeds the occurrence frequency threshold, the decision module 136 proceeds to 406 to select one of those text data to represent the raw audio data.

At 414, after determining that none of the text data is associated with both a confidence level that exceeds the subsequent confidence threshold and an occurrence frequency that exceeds the occurrence frequency threshold, the decision module 136 determines whether there is any text data associated with a confidence level that exceeds the subsequent confidence threshold.

If the decision module 136 determines that there is at least one text data that exceeds the subsequent confidence threshold, the decision module 136 proceeds to 406 to determine whether there is more than one text data that exceeds the subsequent confidence threshold.

However, if the decision module 136 determines that there is no text data associated with a confidence threshold that exceeds the subsequent confidence threshold, the decision module 136 indicates that further analysis or processing of the raw audio data is required (at 416). For example, the decision module 136 may indicate that manual translation of the raw audio data may be required.

FIG. 5 is a flowchart of another example method 500 of selecting text data for the raw audio data.

At 502, the decision module 136 receives translation results from the translation module 134.

At 504, the decision module 136 determines whether any text data is associated with a confidence level that exceeds the first confidence threshold.

Similar to 404, if the decision module 136 determines there is text data associated with a confidence level that exceeds the first confidence threshold, the decision module 136 proceeds to 506. However, if the decision module 136 determines that no text data is associated with a confidence level that exceeds the first confidence threshold, the decision module 136 proceeds to 508.

At 506, after determining that there is text data associated with a confidence level that exceeds the first confidence threshold, the decision module 136 selects the text data with the highest occurrence frequency to represent the raw audio data.

At 508, after determining that no text data is associated with a confidence level that exceeds the first confidence threshold, the decision module 136 determines whether any text data is associated with a confidence level that exceeds a first subsequent confidence threshold.

As described, the decision module 136 may operate based on multiple confidence thresholds, such as the first confidence threshold and multiple subsequent confidence thresholds. Each of the subsequent confidence thresholds is lower than the first confidence threshold. In some embodiments, the first subsequent confidence threshold can be approximately 75%. It will be understood that other values for the first subsequent confidence threshold may also be used.

By providing multiple tiers of confidence thresholds, different degrees of tolerance in the accuracy of the text data may be acceptable. For example, in certain applications, the first confidence threshold may be the only confidence threshold used by the decision module 136 if a high degree of accuracy is required. In certain other applications where a lesser degree of accuracy is possible, multiple different confidence thresholds may be used. That is, even if none of the text data is associated with a confidence level that satisfies the first confidence threshold, some of the text data may satisfy one or more subsequent confidence thresholds, and those text data may be used to represent the raw audio signal.

If the decision module 136 determines that there is text data associated with a confidence level that exceeds the first subsequent confidence threshold, the decision module 136 proceeds to 506 (at which point text data with the highest occurrence frequency is selected to represent the raw audio data). However, if the decision module 136 determines that there is no text data associated with a confidence level that exceeds the first subsequent confidence threshold, the decision module 136 proceeds to 510.

At 510, after determining that none of the text data is associated with a confidence level that exceeds the first subsequent confidence threshold, the decision module 136 determines whether any text data is associated with a confidence level that exceeds a second subsequent confidence threshold.

The second subsequent confidence threshold is less than the first subsequent confidence threshold. In some embodiments, the second subsequent confidence threshold can be approximately 40%. It will be understood that other values for the second subsequent confidence threshold may also be used.

Compared to each of the first confidence threshold and the first subsequent confidence threshold, the second subsequent confidence threshold is much lower and therefore, is suitable for applications that can tolerate a low degree of accuracy. Due to the low confidence level, the decision module 136 may require further processing (at 512) even if there is text data that is associated with a confidence threshold that exceeds the second subsequent confidence threshold. The further processing may involve a manual analysis of the text data to ensure that the text data properly correspond to the raw audio data.

If, on the other hand, the decision module 136 determines that no text data is associated with a confidence threshold that exceeds the second subsequent confidence threshold, the decision module 136 can indicate that no translation is available for the raw audio data (at 514). The speech recognition module 130 may not be able to provide a translation for the raw audio data if there is too much noise signal in the raw audio data, for example.

It will be understood that although only two subsequent confidence thresholds are described with respect to FIG. 5, a greater number of subsequent confidence thresholds may be used.

Figure 6A:
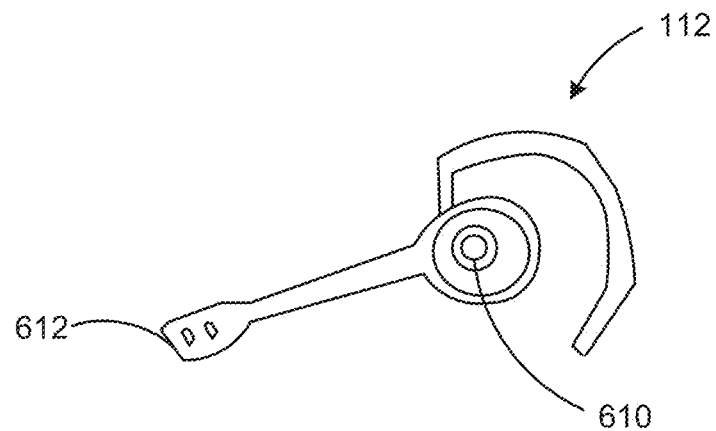
FIG. 6A is a perspective view of an example headset.
Figure 6B:
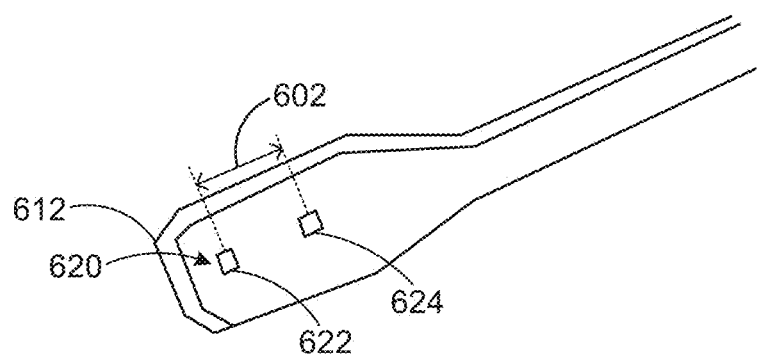
FIG. 6B is a magnified view of a mouthpiece of the headset of FIG. 6A.

FIGS. 6A and 6B illustrate different views of the headset 112. FIG. 6A is a perspective view of the headset 112. As shown in FIG. 6A, the headset 112 in this embodiment includes an earpiece 610 and a mouthpiece 612. It will be understood that the arrangement of the headset 112 is merely an example and that other example arrangements of the headset 112 may be used. For example, the headset 112 may be provided such that the earpiece 610 and the mouthpiece 612 may not be directly attached to each other and may instead be provided as two or more separate components.

Figure 7A:
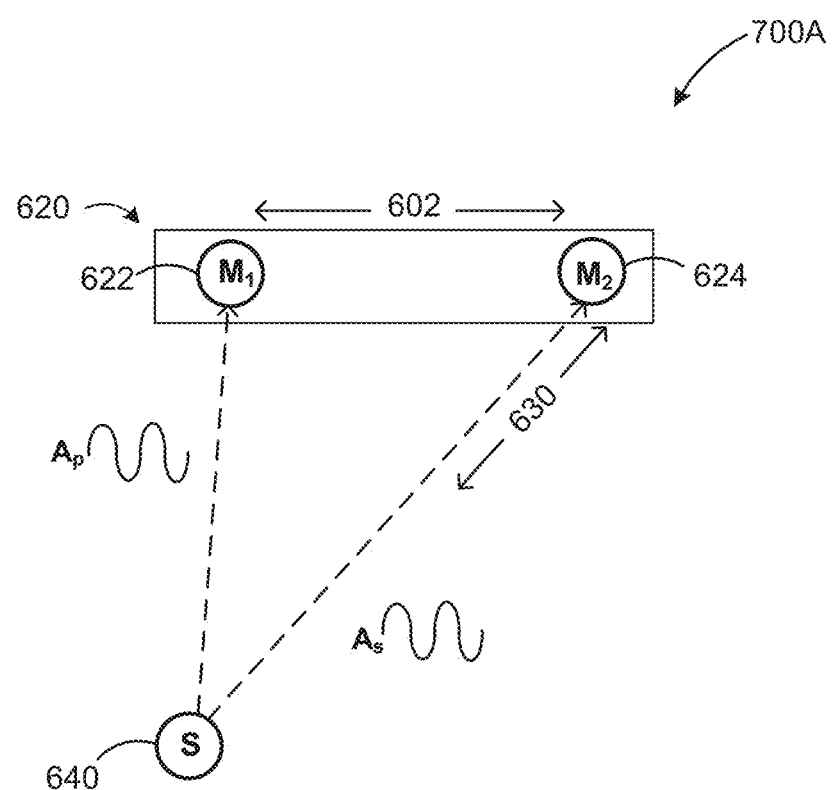

A magnified view of the mouthpiece 612 is shown in FIG. 6B. The mouthpiece 612 can include a microphone array 620 composed of two or more microphones, such as a first microphone 622 and a second microphone 624. The first microphone 622 is separated from the second microphone 624 by a spacing 602. A schematic 700A of the microphone array 620 interacting with an audio source 640 is shown in FIG. 7A.

Generally, providing the microphone array 620 at the mouthpiece 612 can help to minimize noise signals at the received audio signals. The microphones 622 and 624 in the microphone array 620 are provided in a predefined orientation with respect to the audio source 640. To further control an orientation of each of the microphones 622 and 624, the microphones 622 and 624 may be unidirectional. Since the orientation and position of the microphones 622 and 624 are predefined with respect to the audio source 640, the phase difference associated with the audio signal received at each of the microphones 622 and 624 can be determined.

Figure 8:
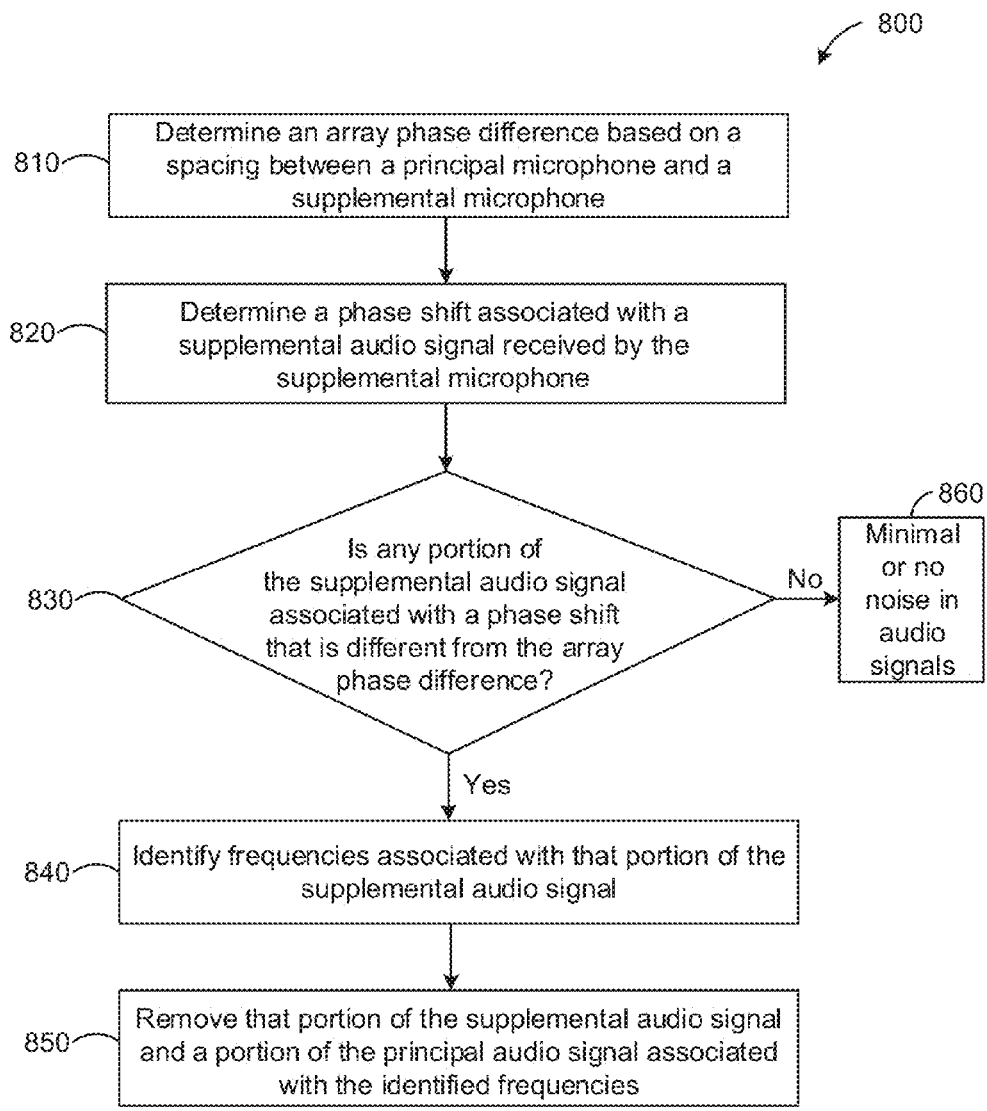
FIG. 8 is a flowchart of a method of minimizing noise in audio signals in accordance with an example embodiment.

FIG. 8 is a flowchart of an example method 800 of minimizing noise in audio signals received by the microphone array 620. The method 800 will be described with reference to FIGS. 7A to 7C.

At 810, the processing module 122 determines an array phase difference based on the spacing 602 between a principal microphone and a supplemental microphone.

Referring to FIG. 7A, one of the first microphone 622 and the second microphone 624 may be referred to as the principal microphone and the other as the supplemental microphone. The principal microphone can receive a principal audio signal $A_p$ from the audio source 640 and the supplemental microphone can receive a supplemental audio signal $A_s$ from the supplemental microphone.

For example, the first microphone 622 in FIG. 7A can act as the principal microphone and the second microphone 624 can act as the supplemental microphone. Example audio paths for each of the principal audio signal $A_p$ and the supplemental audio signal $A_s$ are illustrated in FIG. 7A. As can be seen from FIG. 7A, the audio path for the supplemental audio signal $A_s$ differs from the audio path for the principal audio signal $A_p$ by a distance 630. Based on at least the distance 630, the spacing 602 and the predefined orientation of the supplemental microphone, the processing module 122 can determine, using various trigonometry functions, the array phase difference relative to the principal audio signal $A_p$. The array phase difference generally corresponds to the spacing 602 between the microphones 622 and 624.

In an ideal environment that is not subject to any noise signals, the supplemental audio signal $A_s$ will be different from the principal audio signal $A_p$ by the array phase difference. However, the described system generally operates in rugged environments that are subject to noise artifacts. The determined array phase difference can therefore be used by the processing module 122 to identify and remove noise signals.

It will be understood that other configurations of the microphone array 620 can be used. For example, FIG. 7B is a schematic 700B of a microphone array 620B composed of three microphones 722, 724, and 726. The microphone array 620B may be provided in a triangular configuration.

In embodiments in which more than two microphones are provided in the microphone array 620, one of the microphones will be referred to as the principal microphone while the others will be referred to as various supplemental microphones since an array phase difference will be determined for each of the supplemental microphones with respect to the principal microphone.

In the microphone array 620B of FIG. 7B, for example, the microphone 726 can act as the principal microphone while microphones 722 and 724 act as first and second supplemental microphones, respectively. The processing module 122 can then determine an array phase difference for a first supplemental audio signal $A_{s1}$ received by the first supplemental microphone 722 based on, at least, its orientation with respect to the audio source 640, the distance 730, and the spacing 704, and similarly, the processing module 122 can determine an array phase difference for a second supplemental audio signal $A_{s2}$ received by the second supplemental microphone 724 based on, at least, its orientation with respect to the audio source 640, the distance 732, and the spacing 704.

In some embodiments, the spacing 702 between the principal microphone 726 and the supplemental microphone 722 can be the same as the spacing 704 between the principal microphone 726 and the supplemental microphone 724. In some other embodiments, the spacing 702 between the principal microphone 726 and the supplemental microphone 722 can be the different from the spacing 704 between the principal microphone 726 and the supplemental microphone 724.

Another example configuration for the microphone array 620 is shown in FIG. 7C. FIG. 7C is a schematic 700C of a microphone array 620C composed of five microphones 742, 744, 746, 748 and 750.

In the microphone array 620C of FIG. 7C, the microphone 742 can act as the principal microphone while microphones 744, 746, 748 and 750 act as the first, second, third and fourth supplemental microphones, respectively. Similar to the microphone arrays 620 and 620B, the processing module 122 can determine an array phase difference for each of the supplemental audio signals received by the first, second, third and fourth supplemental microphones. For ease of exposition, only the audio paths for the supplemental audio signals as received by the microphones 742, 748 and 750 are illustrated in FIG. 7C. It will be understood that the audio paths for the other microphones 744 and 746 are analogous to the audio paths for microphones 748 and 750.

As shown in FIG. 7C, the processing module 122 can determine an array phase difference for a third supplemental audio signal $A_{s3}$ received by the third supplemental microphone 748 based on, at least, its orientation with respect to the audio source 640, the distance 760, and the spacing 756, and similarly, the processing module 122 can determine an array phase difference for a fourth supplemental audio signal $A_{s4}$ received by the fourth supplemental microphone 750 based on, at least, its orientation with respect to the audio source 640, the distance 760, and the spacing 758.

The microphone array 620C may be provided in various different configurations in which the supplemental microphones 744, 746, 748 and 750 generally surround the principal microphone 742. An example configuration is shown in FIG. 7C in which the supplemental microphones 744, 746, 748 and 750 are provided in a quadrilateral configuration and the principal microphone 742 is provided at a substantially central location of the quadrilateral configuration.

The orientation of each of the microphones in the microphone array 620 with respect to the audio source 640 will vary based on various factors, such as a number of microphones in the microphone array 620. The use of a greater number of microphones in the microphone array 620 can increase the accuracy of the audio signal since noise signals from a greater number of directions can be removed. However, although accuracy of the audio signal can be increased with a greater number of microphones, the number of microphones used in the microphone array 620 needs to be balanced with other constraints, such as manufacturing cost and power requirements. It will be understood that a range of two to five microphones in the microphone array 620 can generally produce a sufficiently accurate audio signal balanced with a reasonable manufacturing cost and power consumption.

At 820, the processing module 122 determines a phase shift associated with a supplemental audio signal $A_s$ received by each supplemental microphone in the microphone array 620.

Continuing with reference to FIG. 7A, the processing module 122 operates to determine a phase shift at each frequency in the supplemental audio signal $A_s$ as compared with the principal audio signal $A_p$.

At 830, the processing module 122 determines whether any portion of the supplemental audio signal $A_s$ is associated with a phase shift that is different from the array phase difference.

The processing module 122 can identify portions of the supplemental audio signal $A_s$ that is associated with a phase shift that is different from the array phase difference by comparing the phase shift at each frequency in the supplemental audio signal $A_s$ with the array phase difference determined at 810. As described, in an ideal environment with minimal to no noise signals, the principal audio signal $A_p$ should be different from the supplemental audio signal $A_s$ only by the array phase difference due to the spacing 602 between the principal microphone 622 and the supplemental microphone 624. Therefore, if the processing module 122 determines that the phase shift at each frequency of the supplemental audio signal $A_s$ is the array phase difference, the processing module 122 can indicate that there is a minimal amount of noise signal in the audio signal (at 860).

In some embodiments, the processing module 122 may permit a range of tolerance between the phase shift and the array phase difference since the system may withstand a certain level of noise signals within the audio signals. The range of tolerance may vary depending on the relevant frequencies of interest. Depending on the requirement of the system, the range of tolerance may be provided as a range of percentage or absolute values. For example, for certain frequencies, the range of tolerance may be 3 to 10% of the array phase difference.

However, if the processing module 122 determines that the phase shift at one or more frequencies of the supplemental audio signal $A_s$ is different from the array phase difference or exceeds the range of tolerance, the processing module 122 proceeds to 840. Noise signals that are introduced by the environment would appear within the supplemental audio signal $A_s$ as being associated with a phase shift that is different from the array phase difference.

At 840, the processing module 122 identifies frequencies associated with the portion of the supplemental audio signal $A_s$ that is associated with a phase shift that is different from the array phase difference for that supplemental microphone.

Based on the identified portion of the supplemental audio signal $A_s$ at 830, the processing module 122 can identify corresponding frequencies within the supplemental audio signal $A_s$ that are associated with noise signals. The processing module 122 can identify those frequencies as being associated with noise signals that require removal from the audio signals in order to enhance the quality of the audio signals.

As described, an increasing amount of noise signals can be removed with the application of a greater number of supplemental microphones, such as in the microphone arrays 620B and 620C shown in respective FIGS. 7B and 7C.

At 850, the processing module 122 removes that portion of the supplemental audio signal $A_s$ and potentially a portion of the principal audio signal $A_p$ associated with the identified frequencies.

Since the noise signals that require removal will similarly impair the principal audio signal $A_p$ at the identified frequencies, the processing module 122 can remove any portion of each of the supplemental audio signal $A_s$ and principal audio signal $A_p$ that are associated with those identified frequencies.

In some embodiments, prior to receiving any audio signals, the processing module 122 may initiate calibration of the microphones in the microphone array 620. The calibration may occur after different periods of use.

Generally, audio components at the mouthpiece 612, such as the microphones and audio amplifiers, can introduce a phase shift at various different frequencies. The microphones and audio amplifiers can be calibrated together by identifying those phase shift values for the respective components, and storing those phase shift values in the local storage module 128 or the remote storage 150, for example. The processing module 122 may then subtract those phase shift values from any phase shift or angle calculations that may be performed for those microphones in order to remove phase shifts introduced by those components.

The record system 120 may also facilitate the entry of data into data fields of a form. For example, in emergency medical situations, ensuring a suitable and consistent medical treatment relies largely on accurately capturing and sharing that information as soon as possible. Similarly, other environments, such as police investigations or fire response, can rely on rapid collection and sharing of information.

Accordingly, the applications module 126 may include one or more software programs that can be initiated by the processing module 122 for facilitating automatic entry of data into the respective forms, such as the automatic data entry program briefly described.

Figure 9:
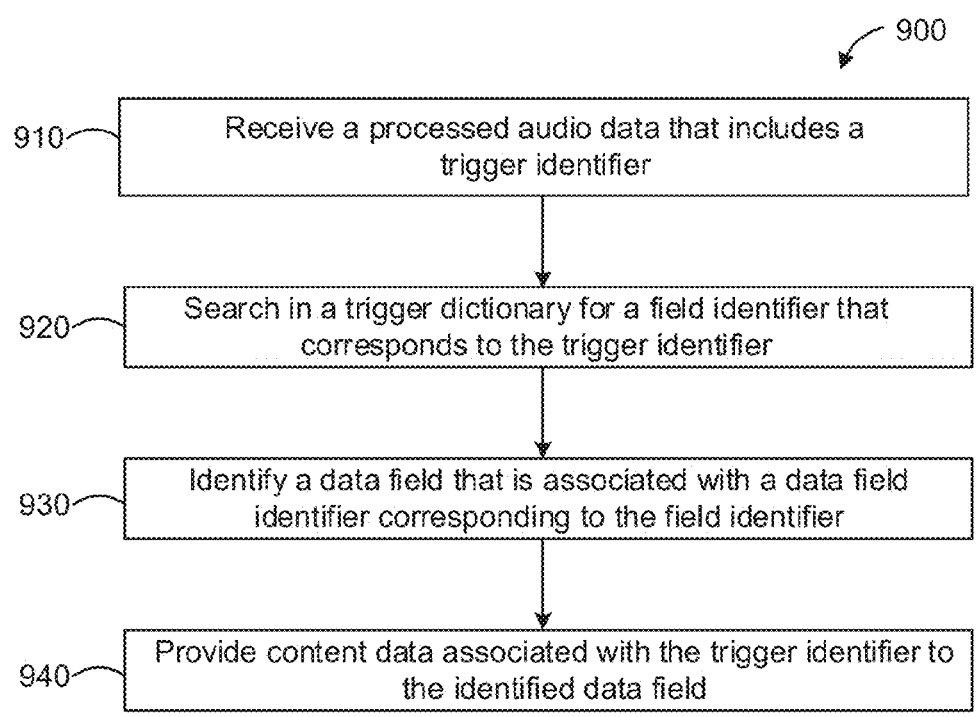
FIG. 9 is a flowchart of a method of automatic entry of data in accordance with an example embodiment.
Figure 10:
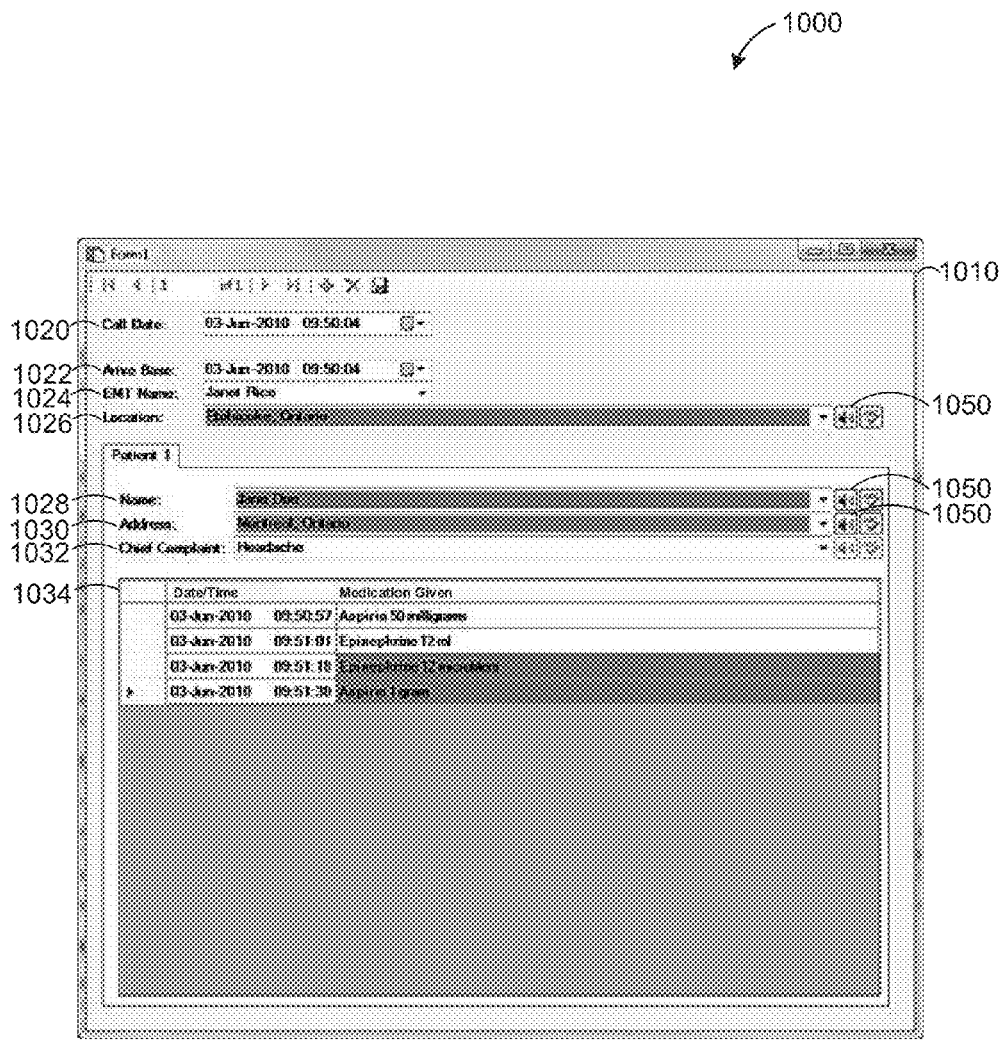
FIG. 10 is a screenshot of an example form that can be automatically propagated with content data.

FIG. 9 is a flowchart of an example method 900 of automatic entry of data. FIG. 10 is a screenshot 1000 of an example form 1010 that can be automatically populated with data. The form may be a medical information related form. It will be understood that other types of forms can be used with the described methods.

The form 1010 can include various different types of data fields, such as drop down boxes, text boxes, checkboxes, combo boxes, buttons and other similar data fields. Each of the data fields is associated with at least one field identifier that can generally represent the type of data to be provided to that data field. The form 1010 shown in FIG. 10 includes various data fields, such as a Call Date field 1020 for receiving data associated with a date and/or time of the emergency call, an arrival date field 1022 for receiving data associated with a date and/or time of the arrival of the emergency response personnel, an EMT field 1024 for receiving data identifying at least one of the emergency response personnel who responded to the emergency call, a location field 1026 for receiving data associated with a physical address of the emergency, a patient name field 1028 for receiving data associated with the patient receiving treatment, a patient address field 1030 for receiving data associated with an address of the patient receiving the treatment, a primary concern field 1032 for receiving data associated with a main complaint by the patient and a procedure field 1034 for receiving data associated with the treatment provided to the patient. Once the user 110 provides the necessary data to the record system 120, the processing module 122 may propagate any of these data fields with the corresponding data without further input from the user 110.

At 910, the processing module 122 receives processed audio data that includes a trigger identifier.

The processing module 122 can receive the processed version of the audio data from the speech recognition module 130 or from one or more other speech recognition systems via the network 140. The processed audio data generally corresponds to audio data that has been, to an extent, modified or translated from raw audio data received by the record system 120. The processed audio data includes one or more trigger identifiers for indicating a type or field of data provided within the processed audio data.

A trigger dictionary will be provided at the local storage module 128 or the remote storage 150. The trigger dictionary includes a list of trigger identifiers. Each trigger identifier is associated with one or more field identifiers and one or more expected contents.

The field identifiers correspond to data fields within a form, such as form 1010. The trigger identifiers can include keywords for representing one or more data fields that are designed to receive similar data but have been identified somewhat differently on different forms. The use of trigger identifiers can therefore increase the number of forms that may be used. For example, the field identifier for the Call Date field 1020 may include arrival date field, call date field, date of call field, and other similar identifiers. The use of trigger identifiers can increase the number of forms that may benefit from the method 900.

Generally, any word can be used as the trigger word for a particular field. In the example of FIG. 10, the trigger word for the "Medication Given" field or "Medication Administered" field is "Proc" (not shown), which represents "Procedure". Each of the relevant fields is then propagated with the corresponding text, namely "Aspirin", "Epinephrine", "Morphine" and "Gravol".

The expected contents associated with each trigger identifier can include types of data (e.g., numerals or text) or content data that is acceptable, or appropriate, for the corresponding data field. The expected content may include any one or more of a word, a phrase, a list of words, a list of phrases and any text data. For example, in the EMT field 1024, the expected content may include a list of emergency medical technicians available on that call date.

At 920, the processing module 122 searches in the trigger dictionary for a field identifier that corresponds to the trigger identifier.

Based on the trigger identifier in the processed audio data, the processing module 122 can parse the trigger dictionary and identify the associated field identifier. Continuing with the above example of the "Medication Given" field, for the trigger identifier "Proc", the processing module 122 can determine, from the trigger dictionary, that the corresponding data field for the data "Aspirin" is associated with one of the field identifiers "Medication Given" field or "Medication Administered" field.

At 930, the processing module 122 identifies a data field that is associated with a data field identifier corresponding to the field identifier.

In order to propagate the data associated with the trigger identifier "Proc." into the form 1010, the processing module 122 identifies a data field in the form 1010 that corresponds to one of the field identifiers, "Medication Given" field or "Medication Administered" field. As noted, each of the data fields in the form 1010 is associated with a corresponding data field identifier. As shown in FIG. 10, the first row of the procedure field 1034 can receive the data associated with the trigger identifier "Proc".

However, if the processing module 122 is unable to identify a data field that corresponds to one of the field identifiers associated with the trigger identifier, the processing module 122 can indicate that the content data associated with the trigger identifier requires additional analysis in order to be propagated into the form 1010. The processing module 122 may then store the corresponding content data into the local storage module 128 or the remote storage 150 for later review and analysis. The processing module 122 may store the content data in association with the trigger identifier and further associate that content data with a manual analysis identifier for indicating that content data requires additional analysis.

At 940, the processing module 122 provides content data associated with the trigger identifier to the identified data field.

Once the processing module 122 has identified the corresponding data field, the processing module 122 can provide the corresponding content data to that data field.

The processing module 122 may, in some embodiments, determine whether the corresponding content data corresponds to the expected content associated with the trigger identifier in the trigger dictionary. For example, the processing module 122 may review the content data for the Call Date field 1020 to determine whether the content data corresponds to at least date data or time data, which are the expected content for the Call Date field 1020. If the processing module 122 determines that a text data is instead provided in the corresponding content data, the processing module 122 can indicate that content data cannot be inputted into the Call Date field 1020 and that further analysis is required for that trigger identifier and corresponding content data.

The processing module 122 may also store the content data into the local storage module 128 or the remote storage 150 in association with the trigger identifier and further associate that content data with a manual analysis identifier for indicating that content data requires additional analysis.

In some embodiments, the processing module 122 may further determine a content source based on the trigger identifier for the data to be provided to the identified data field. The data to be provided to the identified data field may be provided within the received processed audio data or another data source, such as an external device. The content source can indicate an origin of the content data to be provided to the identified data field.

For example, the trigger identifier may include the term "location". The processing module 122 can determine, from the trigger dictionary, that the corresponding data field is the location field 1026 in the form 1010 and that the content source is the Global Positioning System (GPS) that may be available via the network 140 or at the applications module 126. The processing module 122 may then initiate communication with the GPS in order to receive the corresponding content data for the location field 1026.

In another example, the processing module 122 may determine that the content source corresponds to an external device when the data field corresponding to the trigger identifier corresponds to a button control that, upon selection, triggers another application to provide content data to a corresponding data field. For example, the data field may be a control field that may be initiated by the trigger identifier to initiate a defibrillator available via the interface module 124 to provide medical information associated with the patient, such as heart rate or waveforms.

It will be understood that other external computing devices that is capable of communicating data to the record system 120, such as a bar code scanner, a defibrillator and a magnetic card reader, may similarly provide content data to the processing module 122 for automatic input into a data field.

If content data cannot be retrieved from the external devices, the processing module 122 may generate an alert or error message with respect to that data field. The processing module 122 may proceed to automatically input the remaining processed audio data into the other data fields of the form 1010.

In some embodiments, the processing module 122 may, after providing content data associated with the trigger identifier to the identified data field, provide a user control, such as audio data control 1050, in proximity of the data field for receiving an input that triggers retrieval of at least a portion of the audio data associated with the content data provided to that identified data field. The audio data control 1050 may include an audio icon. The audio data control 1050 may be useful for facilitating verification of content data and may be appropriate for critical content data or content data that is provided by an external source.

For example, as described, the location field 1026 may be provided by the GPS. It may be important to verify that the content data provided the GPS corresponds to a location data that was also provided in the processed audio data and therefore, the audio data control 1050 is provided adjacent to the location field 1026.

The present invention has been described here by way of example only. Various modification and variations may be made to these example embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

We claim:

1. A medical response environment based speech recognition system, the system comprising:
   one or more filters to each generate a set of processed audio data based on raw audio data received from one or more computing devices, the one or more filters applying filter processes to the raw audio data to generate the set of processed audio data, the one or more filters comprising at least one filter appropriate for the medical response environment;
   a translator, operable by a processor, to provide a set of translation results for the raw audio data based on the set of processed audio data, each translation result being associated with at least one processed audio data and each translation result including a text data and a confidence level associated with that text data; and
   in response to receiving the set of translation results, a decision controller is automatically triggered by the processor to select the text data that represents the raw audio data, the decision control is operable to:
      identify at least one translation result from the set of translation results that includes the text data associated with the confidence level that exceeds a confidence threshold;
      determine whether the identified at least one translation result comprises more than one translation result;
      in response to determining the identified at least one translation result comprises more than one translation result, determine an occurrence frequency for each text data of the identified at least one translation result and select the text data based on the occurrence frequency, the occurrence frequency representing a number of times that the text data appears in the set of translation results; and
      generate an output signal associated with the selection by the decision controller.

2. The speech recognition system of claim 1, wherein the filter processes comprise at least two different filter processes.

3. The speech recognition system of claim 1, wherein the one or more filters comprises two or more filters.

4. The speech recognition system of claim 1, wherein each translation result comprises a sub-set of translation results for at least one of the processed audio data, the sub-set of translation results including two or more text data and each text data is associated with a respective confidence level.

5. The speech recognition system of claim 4, wherein the two or more text data correspond to alternative representations of the raw audio data.

6. The speech recognition system of claim 1, wherein the decision controller selects the text data associated with a highest occurrence frequency as the text data that corresponds to the raw audio data.

7. The speech recognition system of claim 1, wherein:
   the confidence threshold comprises a set of confidence thresholds, the set of confidence thresholds including a first confidence threshold and at least one subsequent confidence threshold that is lower than the first confidence threshold; and
   the decision controller:
      determines that none of the text data is associated with the respective confidence level that exceeds the first confidence threshold; and
      determines whether any text data is associated with the respective confidence level that exceeds the at least one subsequent confidence threshold.

8. The speech recognition system of claim 7, wherein the decision controller:
   determines that none of the text data is associated with the respective confidence level that exceeds the at least one subsequent confidence threshold; and
   indicates additional processing is required to translate the raw audio data.

9. The speech recognition system of claim 7, wherein:
   the at least one subsequent confidence threshold comprises a first subsequent confidence threshold and a second subsequent confidence threshold that is lower than the first subsequent confidence threshold; and
   the decision controller:
      determines that none of the text data is associated with a confidence level that exceeds the first subsequent confidence threshold;
      determines that at least one text data is associated with a confidence level that exceeds the second subsequent confidence threshold; and
      indicates additional processing on the at least one text data is required to translate the raw audio data.

10. A computer-implemented method of recognizing speech for a medical response environment, the method comprising:
    operating one or more filters to each generate a set of processed audio data based on raw audio data received from one or more computing devices, the one or more filters being operated to apply filter processes to the raw audio data to generate the set of processed audio data, wherein the one or more filters comprise at least one filter appropriate for the medical response environment;
    operating a translator to provide a set of translation results for the raw audio data based on the set of processed audio data, each translation result being associated with at least one processed audio data and each translation result including a text data and a confidence level associated with that text data; and
    in response to receiving the set of translation results, automatically trigger a decision controller to select the text data that corresponds to the raw audio data, wherein the decision controller is operable to:

identify at least one translation result from the set of translation results that includes the text data associated with the confidence level that exceeds a confidence threshold, determine whether the identified at least one translation result comprises more than one translation result;

in response to determining the identified at least one translation result comprises more than one translation result, determine an occurrence frequency for each text data of the identified at least one translation result and select the text data based on the occurrence frequency, the occurrence frequency representing a number of times that the text data appears in the set of translation results; and generate an output signal associated with the selection by the decision controller.

11. The computer-implemented method of claim 10, wherein the filter processes comprise at least two different filter processes.

12. The computer-implemented method of claim 10, wherein each translation result comprises a sub-set of translation results for at least one of the processed audio data, the sub-set of translation results including two or more text data and each text data is associated with a respective confidence level.

13. The computer-implemented method of claim 12, wherein the two or more text data correspond to alternative representations of the raw audio data.

14. The computer-implemented method of claim 10 further comprises selecting the text data associated with a highest occurrence frequency as the text data that corresponds to the raw audio data.

15. The computer-implemented method of claim 10, wherein the confidence threshold comprises a set of confidence thresholds, the set of confidence thresholds including a first confidence threshold and at least one subsequent confidence threshold that is lower than the first confidence threshold; and the method further comprises:
 determining that none of the text data is associated with the respective confidence level that exceeds the first confidence threshold; and
 determining whether any text data is associated with the respective confidence level that exceeds the at least one subsequent confidence threshold.

16. The computer-implemented method of claim 15 further comprises:
 determining that none of the text data is associated with the respective confidence level that exceeds the at least one subsequent confidence threshold; and
 indicating additional processing is required to translate the raw audio data.

17. The computer-implemented method of claim 15, wherein the at least one subsequent confidence threshold comprises a first subsequent confidence threshold and a second subsequent confidence threshold that is lower than the first subsequent confidence threshold; and the method further comprises:
 determining that none of the text data is associated with a confidence level that exceeds the first subsequent confidence threshold;
 determining that at least one text data is associated with a confidence level that exceeds the second subsequent confidence threshold; and
 indicating additional processing on the at least one text data is required to translate the raw audio data.

* * * * *